F. F. WARD.
BROOM RACK AND HOLDER.
APPLICATION FILED MAY 11, 1914.
1,140,422.
Patented May 25, 1915.
2 SHEETS—SHEET 2.
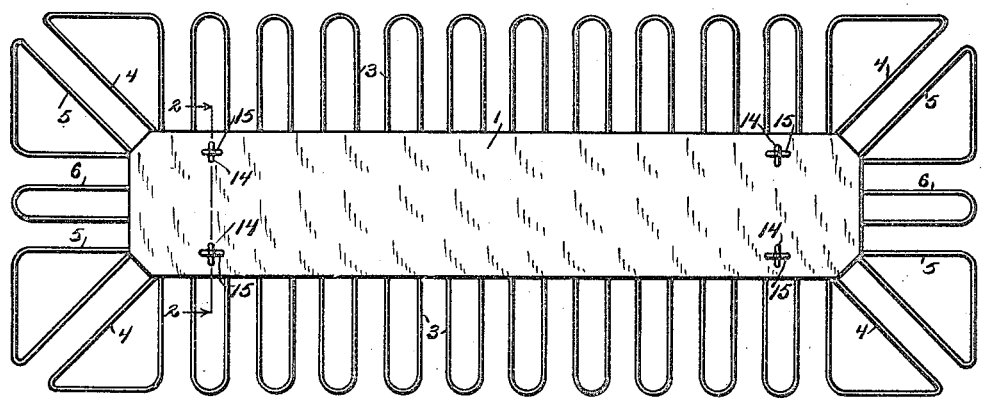
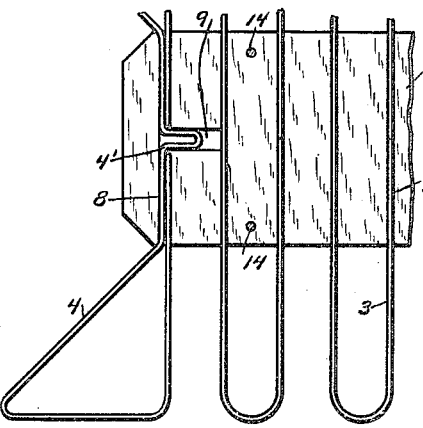
Fig. III.
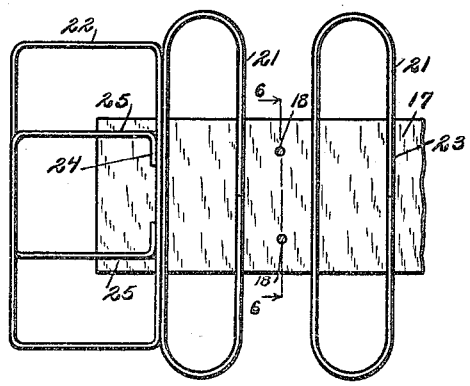
Fig. IV.
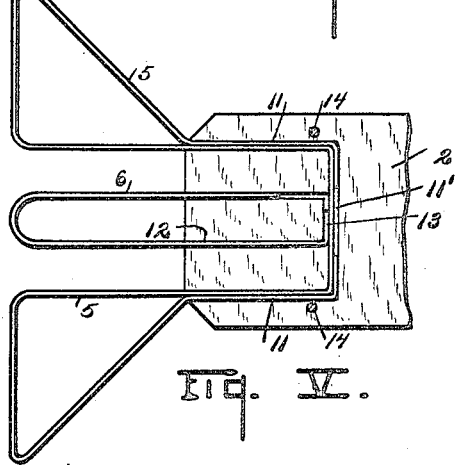
Fig. V.
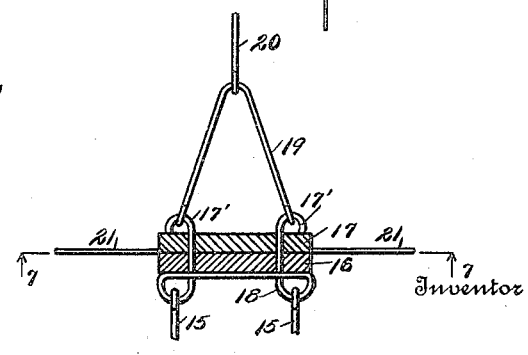
Fig. VII.
Fig. VI.
Witnesses
M. L. Glasgow
C. B. Desjardins
Inventor
Frank F. Ward
By Chappell & Earl
Attorneys

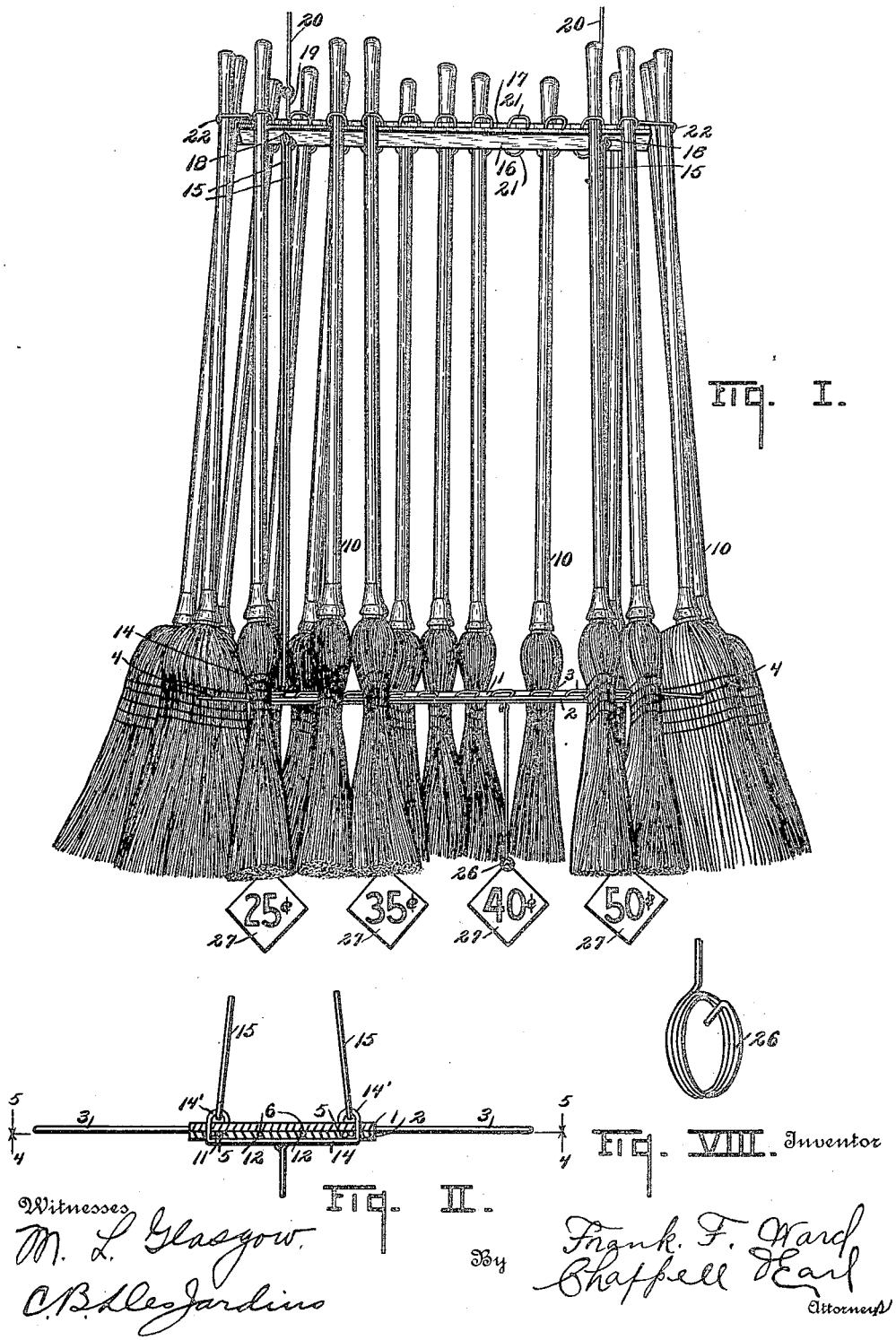

UNITED STATES PATENT OFFICE.

FRANK F. WARD, OF SCHOOLCRAFT, MICHIGAN.

BROOM RACK AND HOLDER.

1,140,422.　　　Specification of Letters Patent.　　Patented May 25, 1915.

Application filed May 11, 1914. Serial No. 837,694.

*To all whom it may concern:*

Be it known that I, FRANK F. WARD, a citizen of the United States, residing at Schoolcraft, in the county of Kalamazoo and State of Michigan, have invented certain new and useful Improvements in Broom Racks and Holders, of which the following is a specification.

This invention relates to improvements in broom racks and holders.

The object of this invention is to provide a durable and substantial broom rack or holder which is adapted to be suspended from overhead, has a neat and finished appearance and may be readily and quickly assembled at a small cost.

Further objects, and objects relating to details and economies of structure and operation will definitely appear from the detailed description to follow.

I accomplish the objects of my invention by the devices and means described in the following specification. The invention is clearly defined and pointed out in the claims.

A structure constituting a preferred embodiment of my invention is illustrated in the accompanying drawing forming a part of this specification, in which:

Figure I is a perspective view of a structure embodying my invention, a number of brooms being shown in place in the rack. Fig. II is an enlarged detail sectional view on the line 2—2 of Fig. III. Fig. III is a top plan view of the lower frame. Fig. IV is an enlarged detail sectional view on the line 4—4 of Fig. II. Fig. V is an enlarged detail sectional view on the line 5—5 of Fig. II. Fig. VI is a detail sectional view of the upper frame on the line 6—6 of Fig. VII. Fig. VII is a detail sectional view of the upper frame taken on the line 7—7 of Fig. VI. Fig. VIII is a detail perspective view of the lower end of one of the card holding links.

In the drawing, similar reference characters refer to similar parts throughout the several views, and the sectional views are taken looking in the direction of the little arrows at the ends of the section lines.

Considering the numbered parts of the drawing, the broom rack or holder consists of an upper and a lower frame, the lower frame comprising a pair of boards 1 and 2, said boards being of identical shape and size and superimposed one upon the other. The upper board 1 is provided on its lower surface with a plurality of transversely extending channels 7, 7 in which the closed loops 3 of oblong shape are adapted to lie, said loops being longer than the width of the board so that the ends thereof extend beyond the board at either side. At each end of the upper board, on the lower face thereof, are provided the transversely extending channels 8 slightly wider than the other channels and the cross channels 9 extending from the channels 8 to the next adjacent channel 7. A piece of wire is bent so as to form at each end the triangular loops 4, and the middle of this wire is provided with a loop 4' which lies in the channel 9. The ends of the wire and the middle portions thereof lie in the channel 8. Wires bent in this shape are provided at each end of the board. The lower board 2 is provided on its upper face at each end with U-shaped channels 11 and with channels 12, 12 extending parallel to the U-shaped channel and connected with the base thereof at 11'. A wire is bent into substantially U-shaped form and bent back upon itself to provide loops 5, 5, the main portions of this wire and the ends thereof lying in a U-shaped channel 11. The wire 6 is bent to form a U-shaped loop the ends of which lie in the channels 12, 12, one end of the wire being bent at 13 to lie in the channel 11'. Similarly bent wires are provided at each end of the board 2. The two boards are glued together with the channeled faces toward each other and a U-shaped clip 14 is passed through the two boards from the under side and the ends bent over as at 14' to form eyes. When the two boards are placed together they form a structure such as shown in top plan view in Fig. III, and provided with loops extending from all sides thereof, said loops being spaced apart to form recesses of such size and shape as to be adapted to receive the body portions of the brooms 10, as clearly shown in Fig. I of the drawing.

The upper frame consists of a pair of boards 16 and 17 of identical shape and size which are superimposed one upon the other. The lower face of the upper board 17 is channeled, being provided with a plurality of transversely extending channels 23 in which the closed loops 21 lie, said loops being oblong in shape and longer than the boards are wide so that the ends thereof extend beyond the board at each side. The end channels of the board are wider than the other channels and receive, in addition to one side of the loop 21, the wires 22 which have their ends bent at 25 at right angles to the loop 21 so as to form three connected loops. The ends of the wire are bent toward each other at 24 lying in the end channels alongside of the wire 22 and the loop 21.

Links 15 are suitably connected to the eyes 14' formed by the ends of the U-shaped clip and the upper ends of these links 15 are passed through loops formed in the bottom of the U-shaped clip 18, the ends of which pass through the boards 16 and 17 which are glued together and clamp them, the upper ends of said clips being turned over at 17' to form eyes to which a bail 19 is suitably connected. Suspension links 20, 20 are connected to the bails 19 for suspending the whole structure. The links 15 connect the lower frame with the upper frame. Links 26, provided with eyes at the lower ends, are connected to the bottom of the lower frame and these links are provided at their lower ends with eyes carrying the price cards 27, 27 for indicating the prices of the brooms placed in that particular portion of the rack.

From the description of the parts given above, the operation of the structure should be very readily understood. The body of the broom is held in the notches or recesses formed by the loops 3, 4, 5 and 6 and the upper ends of the handles are received within the loops 21, 22, etc., provided on the upper frame. The whole device is adapted to be suspended from the ceiling in a convenient place for display purposes so that by this device brooms can be very effectively displayed without taking up a great deal of space.

It will be seen that the recesses for holding the brooms are formed of closed loops which are secured between two boards in their respective frame. By providing a plurality of loops of substantially identical form the frame can easily be made up and a large number of the loops can be made up at one time. These can be rapidly and quickly assembled in place in the frame. At the same time this structure makes a very neat and durable rack which has a finished appearance when assembled in place. By the shape and construction of the loops 4, 5 and 6 I am able to utilize to the utmost the capacity of the frame so that I can support brooms from the ends and corners of the frame as well as the sides. By the structure of the three connected loops at the ends of the upper frame, I am able to take care in a small space of the handles of all the brooms that can be carried by the lower frame. It will therefore be seen that my entire structure coöperates together to form a broom rack of greatly increased efficiency and capacity.

It will be seen that I provide a pair of suspension links 20 made of heavy steel rods which will not bend very much, said suspension links being connected to the bails 19 at points near the ends of the upper frame. Due to this form of construction and suspension the display rack will not tip or tilt if it is loaded heavier on one side than the other as would be the case if the brooms were all placed in one end of the rack. This results in a much more sightly and effective display rack.

I am aware that the particular structure which I have here shown may be varied considerably without departing from the spirit of my invention, therefore, I desire to claim the same broadly. However, I have found the particular form which I have here shown to be preferred and, therefore, I desire to claim the same specifically as well as broadly as indicated by my appended claims.

Having thus described my invention, what I claim as new and desire to secure by Letters Patent, is:

1. In a structure of the class described, a broom holding frame comprising a pair of members superimposed one upon the other, one of said members being provided with a plurality of channels extending transversely thereof, a plurality of closed loops disposed in said channels, the ends of said loops extending beyond the sides of said members, suitable channels provided at the ends of one of said members, wires bent to form oppositely disposed and substantially triangular loops and disposed in said end channels with the loops extending from the corners thereof, U-shaped channels provided in the ends of the other member, wires disposed in said U-shaped channels and bent to form substantially triangular loops extending from the corners thereof, said last named triangular loops being disposed between said first named triangular loops when the members are superimposed, U-shaped channels provided in the ends of said member and extending longitudinally thereof, and U-shaped loops disposed in said channels and extending from the ends of said members, U-shaped clips having their ends extending through said superimposed members and clamping them together, the ends of said clips being bent over to form eyes, all of said loops being so spaced apart as to provide recesses therebetween adapted to receive the body portion of a broom, all coacting substantially as described for the purpose specified.

2. In a structure of the class described, a broom holding frame comprising a pair of members superimposed one upon the other, a plurality of channels extending transversely of one of said members, a plurality of closed loops disposed in said channels, the ends of said loops projecting beyond the sides of said members, wires bent to form three connected loops disposed in suitable channels in one of said members at the ends thereof, a U-shaped clip passing through said superimposed members and clamping them together, the ends of said clips being turned over to form eyes and said clips being so bent as to form a pair of eyes below the lower member, all coacting substantially as described for the purpose specified.

3. In a structure of the class described, a broom holding frame comprising a pair of members superimposed one upon the other, a plurality of channels extending transversely of one of said members, a plurality of closed loops disposed in said channels, the ends of said loops projecting beyond the sides of said members, wires bent to form three connected loops disposed in suitable channels in one of said members at the ends thereof, a U-shaped clip passing through said superimposed members and clamping them together, the ends of said clips being turned over to form eyes and said clips being so bent as to form a pair of eyes below the lower member, a bail connected to the uppermost eyes of each clip, and a suspension link connected to each of said bails, all coacting substantially as described for the purpose specified.

In witness whereof, I have hereunto set my hand and seal in the presence of two witnesses.

FRANK F. WARD. [L. S.]

Witnesses:
  CHARLES E. STUART,
  FOSTER M. STUART.

Copies of this patent may be obtained for five cents each, by addressing the "Commissioner of Patents, Washington, D. C."